United States Patent
Frieden

[19]

[11] Patent Number: 6,144,301

[45] Date of Patent: Nov. 7, 2000

[54] ELECTRONIC TRACKING TAG

[75] Inventor: Donald J. Frieden, Friendswood, Tex.

[73] Assignee: Safetrac Control Systems, Inc., Friendswood, Tex.

[21] Appl. No.: 08/797,430

[22] Filed: Feb. 10, 1997

[51] Int. Cl.[7] .................................................. G08B 13/14

[52] U.S. Cl. ........................... 340/572.8; 40/664; 283/74; 340/825.34

[58] Field of Search .............................. 340/572.8, 693.5, 340/825.34, 825.54; 235/375, 385; 705/22, 28; 283/72, 74, 107, 111; 361/811; 40/655, 661.01, 662–664, 124.04

[56] References Cited

U.S. PATENT DOCUMENTS

| | | | |
|---|---|---|---|
| D. 314,016 | 1/1991 | Mitchell | D20/43 |
| D. 316,877 | 5/1991 | Mitchell | D20/43 |
| D. 382,912 | 8/1997 | Frieden | D20/22 |
| 4,812,823 | 3/1989 | Dickerson | 340/572 |
| 4,899,134 | 2/1990 | Wheeless, Jr. | 340/572 X |
| 5,151,684 | 9/1992 | Johnsen | 340/572 |
| 5,440,295 | 8/1995 | Ciecwisz et al. | 340/572 X |
| 5,461,807 | 10/1995 | Johnson | 40/301 |

*Primary Examiner*—Thomas Mullen
*Attorney, Agent, or Firm*—Browing Bushman

[57] ABSTRACT

An electronic tracking tag 10 may be attached to various types of physical assets to assist in asset identification. The plastic material tag body 12 includes a receiving cavity 60 therein so that a drawer 14 and an RFID transponder 16 may be slid into the receiving cavity and mechanically locked in the inserted position within the receiving cavity. A visual display cavity 54 is provided on the tag body, and a display label 56 may be selectively positioned on the tag body. The tag body with the electronic transponder therein may be secured to the physical asset by screws or other conventional securing members 46 positioned in respective securing holes 42, 44 provided in the tag body. Alternatively, one or more flexible straps 18, 19 may extend through a respective tie down hole 46, 48 in the tag body for strapping the tag body to the physical asset. A substantially universal tracking tag 10 of the present invention may be easily and economically read by an RFID reader unit to assist in asset identification, tracking, and equipment safety. Significant benefits are realized by providing a tagging system wherein an electronic transponder may be selected and secured within the tag body shortly before the tag body is attached to the physical asset.

39 Claims, 1 Drawing Sheet

ELECTRONIC TRACKING TAG

FIELD OF THE INVENTION

The present invention relates to tagging devices for assisting in the identification of physical assets. More particularly, this invention relates to an electronic tracking tag which utilizes RFID technology to both assist in identifying and tracking physical assets, and also to ensure that assets comply with applicable safety regulations.

BACKGROUND OF THE INVENTION

Identification tags have long been employed for assisting in the identification and tracking of physical assets, and to facilitate timely safety inspection of certain assets to comply with applicable regulations. Various types of I.D. tags are sold by numerous companies, including Scafftag Ltd. U.S. Design Pat. Nos. 314,016 and 316,877 disclose specific types of identification tags.

Most identification tags rely upon printed matter for visually providing relevant information about the tagged asset to a human reader. Typical information includes the type of equipment tagged, the equipment manufacturer and model number, and the date of the last equipment safety inspection. While systems utilizing printed matter tags are relatively inexpensive, they suffer from problems associated with the loss or separation of the tag from the physical asset, the misreading and misentry of information from the tag by the human reader, and the inaccurate or insufficiency of safety inspection data on the tag. Tagged equipment is often placed in a harsh environment, and printed information on tags frequently is covered with dirt or grease, so that the printed tag cannot be read. In other environments, the tag material or the print on the tag is damaged or quickly aged by chemical exposure or weather conditions, so that the tag cannot be read. Moreover, considerable time and expense are required to obtain access to the tag, read and record the information, and input the information into a computer recordation system.

One of the more promising technologies for overcoming the problems associated with printed matter tags includes the use of a tag with an electronic transponder to store relevant information. The cost of radio frequency identification (RFID) transponders has significantly reduced in recent years, and commercially available RFID transponders are available from various suppliers for providing either a "read only" output, or a "write and read" output. Accordingly, an identification tag with an electronic transponder can be read by a radio frequency reader device, which may electronically record and process the data for inventory, tracking, and safety recordation purposes. The transponder may thus be placed at a position where it cannot easily be engaged by an operator, although the information in the transponder may still be read by a remote reader. Moreover, line of sight between the transponder and the reader is not required. The cost of manually reading the identifying information is significantly reduced, and the information is accurately recorded electronically in a format which does not require the subsequent manual entry of data into a computer.

Major problems associated with electronic or "smart" identification tagging systems are the limited versatility of the tag, the high cost of manufacturing the tag, the limited techniques for attaching the tag to the physical asset, and the high cost of initially tagging and retagging the asset. Most commercially available RFID tags integrate the transponder into the tag when the tag is initially manufactured. Accordingly, the limitations and features of the transponder are fixed when the tag is initially manufactured. Also, prior art electronic tags are then attached to the asset utilizing a particular attachment technique. Since the assets vary widely, the tag frequently may not be secured to the asset at a location which is best suited for the subsequent identification and reading of the tag by the RFID reader. Accordingly, significant costs are associated with initially tagging and subsequently re-tagging the physical assets. Other RFID tagging systems embed the transponder in the physical asset when the asset is manufactured. This technique has some advantages, but in most cases the asset manufacturer is not willing to devise a "special" tagged product for customers who desire that feature. All prior art RFID tagging systems have significant inventory costs since the entire cost of the tag including the RFID transponder is incurred when the tag is manufactured. When the desired "read only" information in the transponder changes, the manufacturing and inventory cost of the entire tag is effectively lost.

The disadvantages of the prior art are overcome by the present invention. An improved electronic tracking tag is hereinafter disclosed which allows a selected transducer to be incorporated into the tag just prior to affixing the tag to the physical asset. The tag is manufactured in a manner which facilitates its attachment to the physical asset in a selected one of various attachment techniques, thereby significantly increasing the number of suitable locations on the physical asset for attaching the tag, and for significantly reducing the cost of tagging the asset.

SUMMARY OF THE INVENTION

The electronic tracking tag may be attached to various types of physical assets, and may be repeatedly used to assist in asset identification for inventory or asset tracking purposes. A radio frequency transmitter or transponder structurally locked within the tag body may be periodically read by an RFID reader unit, and the information both displayed to the reader operator and subsequently transferred electronically from the reader unit to a storage or data recordation computer. The tag also allows for the electronic reading of asset safety information, and provides for the visual display of appropriate warning labels. A "read and write" transponder may be selected so that a safety inspector may periodically input the date and type of safety inspection, so that the reader unit is able to output a history of safety inspections for a particular piece of equipment.

The identification tag includes a plastic material body, a drawer for insertion into a cavity within the body, and a transponder supported on the drawer. The transponder may be selectively placed on the drawer, the drawer slid into the body and mechanically locked in place within the body, and the body then attached to the physical asset. Alternatively, the body may first be attached to the asset then the drawer and the selected transponder may be inserted into the body. Once the drawer is inserted into the plastic material body of the tracking tag, the drawer is mechanically locked in place so that the transponder cannot be removed without destroying the body.

The universal body may receive various types of transponders. The cost of an identification tag is significantly reduced and its versatility improved by selecting a transponder to be used with a particular tag body at the time the tag is attached to the physical asset. The body has curved sides surfaces and preferably a curved top surface to reduce the likelihood of the identification tag getting caught or knocked off the asset. The body preferably includes a display cavity which extends to the top surface of the holder. A visual display label may be selectively positioned within and removed from the display cavity for providing a safety warning, inspection data, or any other desired data to the equipment operator. The body itself may also have warning information such as "Do Not Operate" imprinted directly on the body or otherwise permanently affixed to the body. If the display label is removed, the warning information affixed to the tag body may thus be visible to a potential equipment operator.

The tag body is constructed so that it may be attached to various locations on various types of physical assets. A base surface of the body lies substantially within a base plane for mating engagement with a flat surface or the physical asset. First and second securing holes extend from the top face to the bottom face of the body. Screws, rivets, or other conventional securing members may be received within the securing holes for securing the body to the physical asset. The body also includes first and second tie down holes each passing from the upper surface to the lower surface of the body and including a cross member therein. A strap or other tie down device may be inserted in each hole and wrapped around the cross member for tieing down the body to the physical asset. The cost of attaching the tag to the physical asset is reduced by providing multiple techniques for securing the tag to the physical asset.

It is an object of the present invention to provide an improved electronic tracking tag to assist in asset identification. The tag includes a body having a receiving cavity, a drawer for positioning within the receiving cavity, and a selected electronic transponder. The drawer and transponder may be slid as a subassembly into the receiving cavity and mechanically locked in placed. The transponder may thus be selected and fixed within the body of the tag, then the tag promptly secured to the asset.

It is another object of the present invention to provide an electronic tracking tag which may be used for both asset identification and tracking, and may also be used to assist in ensuring that an asset complies with relevant safety regulations. The tag body is adapted for receiving a selected one of several warning labels to provide a warning notice or inspection data to the user or operator of the asset. If the warning label is removed from the tag body, warning information permanently affixed to the tag body will then be exposed.

It is a feature of the present invention that a selected electronic transponder may be inserted into the body of the tracking tag just prior to the body being attached to the physical asset. The transponder cannot be removed from the tag body without destroying the tag body, thereby significantly reducing the likelihood of tag tampering.

It is a feature of the present invention that the tag body is configured for minimizing the likelihood of the tag becoming caught on objects as the physical asset is used.

It is another feature of the invention that the tag body is constructed so that various techniques may be used for reliably attaching the tag body to the physical asset. The time required to attach the body to the asset is reduced, and the tag may be attached at an increased number of desirable locations on the physical asset, thereby facilitating tag reading.

A significant advantage of the present invention is the reduced cost of manufacturing and installing electronic tracking tags on physical assets. High reliability for recording the identifying information is obtained by utilizing an electronic transponder for storing and outputting the information, and an electronic reader which may record the information in a format so that it may be electronically transferred to a processing or storage computer.

These and further objects, features, and advantages of the present invention will become apparent from the following detailed description, wherein reference is made to the figures in the accompanying drawings.

BRIEF DESCRIPTION OF THE DRAWINGS

FIG. 3 also illustrates the drawer slid into the receiving cavity in the transponder body.

DETAILED DESCRIPTION OF THE PREFERRED EMBODIMENTS

Figure 1:
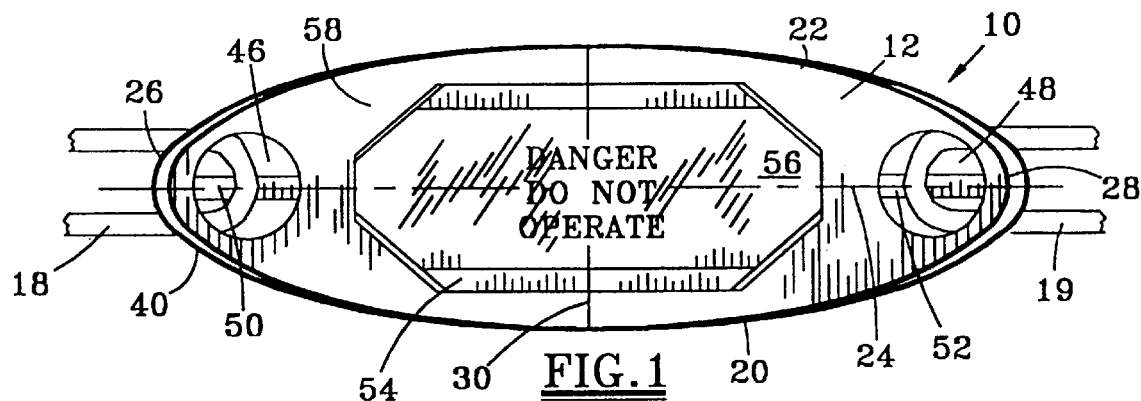
FIG. 1 is a top pictorial view of one embodiment of a tracking tag according to the present invention, with tie straps being shown for securing the tag body to the physical asset.

FIG. 1 depicts a top pictorial view of one embodiment of an electronic tracking tag 10 according to the present invention. The tag comprises a plastic material body 12, a drawer 14 also shown in FIGS. 3 and 4, and an electronic transponder 16 shown in FIG. 4. The plastic material body and the drawer may be fabricated from any number of electrically non-conductive plastic materials, such as nylon, ABS, high density polyethylene, or polypropylene. In the FIG. 1 embodiment, the tag includes a pair of tie down straps 18, 19 designed to secure the body 12 on the asset to be tagged, as explained below.

Figure 2:
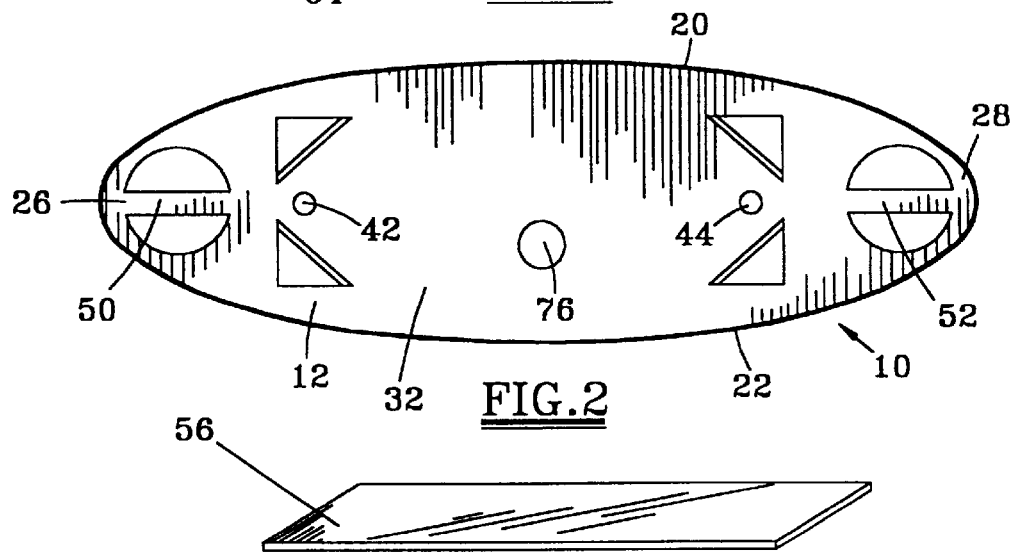
FIG. 2 is a bottom view of the tracking tag shown in FIG. 1, with the tie straps removed.

As shown in the FIG. 1 top pictorial view and the FIG. 2 bottom view, the body 12 has a generally oval configuration, with a curved front face 20 and a similarly curved rear face 22. The body 12 is thus preferably symmetrical about a central elongate body axis 24. The left-side face 26 and the right-side face 28 of the body are also curved, and the body 12 is also preferably symmetrical about transverse body axis 30. As explained further below, the body 12 is designed to be secured to any asset which subsequently is identified for inventory or tracking purposes. The oval configuration of the body reduces body corners and thus the likelihood of the body becoming caught on an object and detached from the tagged asset during use of the tagged asset.

Figure 3:
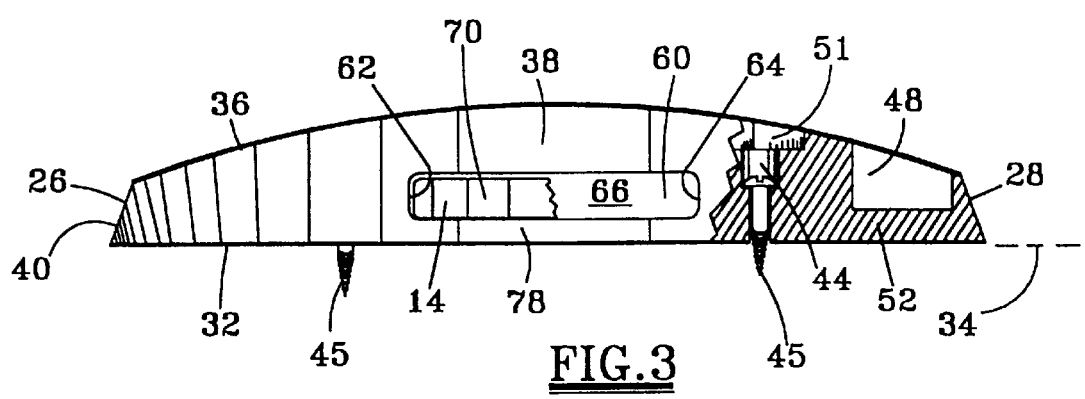
FIG. 3 is a front view of a tracking tag according to the present invention, partially in cross-section, illustrating a planar lower surface on the tag body and a pair of screws for fastening the body to a selected physical asset.

Referring now to FIGS. 2 and 3, the body 12 includes a base face 32 which preferably lies substantially within a base plane 34. By providing the planar base surface 32, the base face of the body may be easily and reliably pressed against a corresponding planar surface of the asset to be tagged. As shown in FIG. 3, the top face 36 of the body 12 is also preferably curved to minimize the tag being snagged on an object during use of the tagged equipment. Accordingly, the center portion 38 of the body has a thickness which is greater than the thickness of each of the left-side face 26 and right-side face 28 of the body. As shown in FIGS. 1 and 2, each of the front face 20 and the rear face 22 of the body is substantially perpendicular to the base face 32. As shown in FIG. 3, each of the left-side face 26 and right-side face 28 have a slight taper so that an upper portion of the body 12 is slightly shorter than a lower portion of the body 12. The slight taper 40 as shown in FIGS. 1 and 3 allows the body to be more easily removed from a mold during an injection molding process, and further minimizes the tag becoming unintentionally snagged on an object. Also, those skilled in the art will appreciate that either a base-wider taper as shown in FIG. 3 or a base-thinner taper as discussed above could be formed on the front face 20 and the rear face 22 of the body.

Referring to FIGS. 2 and 3, the body 12 is provided with first and second securing holes 42 and 44 each extending from the top face 36 to the bottom face 32 of the body. Each securing hole 42 and 44 is adapted to receive a suitable securing member for attaching the tag body to the physical asset. As shown in FIG. 3, a suitable securing member may be a conventional screw 45. Those skilled in the art will appreciate that wood screws, metal screws, rivets, nails, or other conventional securing members may be inserted into the securing holes 42 and 44 for securing the base face 32 of the body against the physical asset to be tagged.

As shown in FIGS. 1 and 2, the body 12 also preferably includes first and second tie down holes 46 and 48 which also each extend from a top face to the bottom face of the body. Each tie down hole 46, 48 forms a fairly sizeable throughport, and a crossbar 50, 52 is provided across each throughport. The crossbars 50 and 52 as shown in FIGS. 1 and 2 lie substantially along the elongate body axis 24, although the mold for the body 12 may be designed so that the crossbars are orientated in any desired orientation within a respective tie down hole. Each crossbar 50, 52 is preferably formed as an integral portion of the body 12 to reduce the manufacturing costs. As shown in FIG. 3, each crossbar is preferably formed substantially adjacent the base plane 34. The substantial diameter of each tie down hole 46, 48 allows a conventional tie down strap 18, 19 to be passed from the bottom of the body 12 above a respective crossbar and then back down through the bottom of the body, as shown in FIG. 1, so that each strap may then be tied or otherwise secured to a physical asset. Various types of straps 18, 19 may be used for tying the body 12 to the member, and suitable tie down straps include ties that are similar to trash bag ties, wires, and plastic tie down straps such as those marketed under the TYRAP mark by Thomas & Betts or under the PAN-TIES mark by Panduit Company. Although the tie down straps 18, 19 may be used for attaching the body 12 to various components of the physical asset to be tagged, straps 18, 19 are particularly well suited for interconnecting a tag body 12 to a power supply cord of an electrically powered physical asset, such as a drill, sander, or other tool commonly used in the construction industry.

FIGS. 1, 2, and 3 also depict that the tag body 12 includes a display cavity 54 which extends downward from the top face 36 of the tag body. The display cavity 54 is designed to receive a selected visual display label 56, which has asset use, inspection data, or warning information printed thereon. The visual display label 56 preferably consists of a thin plastic sheet typically about 20 mils thick having a generally rectangular configuration and conventionally used for labels. The plastic sheet 56 may contain any desired printed matter, such as "DANGER DO NOT OPERATE", "DO NOT USE UNTIL EQUIPMENT IS INSPECTED" OR "FOR USE ONLY BY AUTHORIZED PERSONNEL." A selected one of the thin plastic sheets 56 may thus be inserted into the cavity 54. The plastic sheet 56 may subsequently be easily removed from the cavity 54 using a fingernail, key, or screwdriver, and a new plastic sheet inserted. If the plastic sheet 56 is removed, warning information such as "Do Not Use" may be heat stamped or otherwise permanently affixed to the body, and will thus be exposed to warn an equipment operator. The plastic sheet 56 is maintained in place on the body 12 since each of its four corners fit under a label overhang 58. Although the plastic sheet 56 is not shown in the FIG. 2 drawing, those skilled in the art will appreciate that the corners of the plastic sheet 56 inserted in the display cavity 54 will be visible in the FIG. 2 drawing. It should be understood that an opaque label inserted in the cavity 54 will cover up the top of the securing holes 42 and 44 and the top of the securing members 46, so that it will not be readily apparent to one viewing a tag body 22 attached to a physical asset how the tag body may be removed from the asset.

Figure 4:
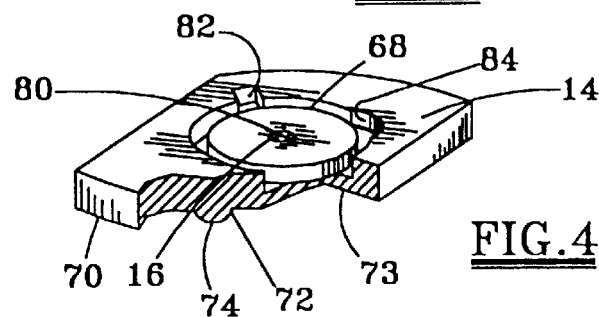
FIG. 4 is a pictorial view of a drawer and a transponder prior to being inserted into the tag body.

FIGS. 2, 3 and 4 illustrate a significant feature of the present invention relating to the use of a drawer 14 for supporting an electronic transponder 16 thereon, so that the drawer and transponder may be slid as a subassembly into a receiving cavity 60 within the tag body. As shown in the drawings, the receiving cavity 60 has a generally rectilinear configuration and extends to an opening in the front face 20 of the tag body. The side wall 62, 64 of the receiving cavity are thus generally perpendicular to the base face 32, and more importantly are configured so that there is only a small gap between the sides of the drawer 14 and the side walls 62, 64 when the drawer 14 is inserted into the cavity 60. The back surface 66 of the receiving cavity is thus perpendicular to both side walls 62, 64 and the base face 32, and is spaced between the front face 20 and the back face 22 of the tag body so that the back of the drawer is not visible when viewing the back face 22 of the tag body.

The electronic transponder 16 is of the conventional type used with RFID technology. Any number of electronic transponders may be used with the tag 10 of the present invention, including the Model IT52 or IT254 electronic transponder manufactured by Motorola Indala Corporation and the Model RI-TRP-R9WK or RI-TRP-W9WK transponder manufactured by Texas Instruments. The drawer 14 includes a receptacle 68 therein sized to receive various types of transponders manufactured by different companies. The top face of the transponder 16 when positioned in the receptacle 68 does not extend upward significantly above the top face of the drawer, thereby allowing the drawer and transponder as an assembly to be easily slid into the rectilinear receiving cavity 60. The receptacle 68 as shown in FIG. 4 includes a generally rectangular side cavity 82 and a curved wall cavity 84 each sized for receiving a particular type of transponder. A center post 80 within the cavity 68 allows different diameter transponders each with a center hole sized to fit over the post 80 to remain centered in the cavity 68.

The tag of the present invention includes a mechanism for securing the drawer 14 in the installed position within the receiving cavity 60, so that the drawer cannot be easily removed and the transponder discarded. As shown in FIGS. 1 and 3, the front drawer face 70 does not extend substantially outward from the front face 20 of the tag body when the drawer is in the installed position. Instead, the front face 70 of the drawer preferably is either slightly curved and thus co-planar with the front face 20 of the body 12, or is recessed within the cavity 60 when the drawer 14 is in the installed position. Accordingly, one cannot use a pliers or other conventional tool to grasp the door and try to pull the drawer 14 out of the receiving cavity 60 of the body 12.

Various mechanical lock mechanisms may be used for securing the drawer in the inserted position within the receiving cavity. A preferred lock mechanism includes a mechanical hook such as hook member 72 which is affixed to and extends downwardly from a lower face 73 of the drawer 14. As shown in FIG. 2, a generally cylindrical hook cavity 76 is provided in the body 12. The hook cavity 76 is thus in communication with the receiving cavity 60, and is sized for receiving the hook member 72 when the drawer 14 is slid into the receiving cavity and positioned in the fully inserted position. It should be understood that, when installing the drawer in the body 12, the thickness between the top of the drawer 14 and the bottom 74 of the hook member 72 may be slightly greater than the thickness of the receiving cavity 60. The lower surface 74 of the hole member 72 may be tapered slightly to facilitate sliding insertion of the drawer 14 into the cavity 60. The drawer 14 and the electronic transponder 16 fitted thereon may thus be slid into the cavity 60 since the plastic material of the body 12 allows the body 12 and particularly the relatively thin plate portion 78 of the body between the lower face 32 and the cavity 60 to flex so that the drawer may be pressed into the cavity 60, then the drawer slid in place. Once the hook member 72 is positioned over the hook cavity 76, the hook member 72 drops into the cavity 76, and the drawer is then mechanically locked in place. Even if one were to insert a tool into the bottom of the hook cavity 76 and press upward on the lower surface 74 of hook member 72, it would be difficult to remove the drawer 14 from the cavity 60 since a pliers or other tool cannot readily grasp the door and pull the drawer outward from the front face 20 of the body. Those skilled in the art will appreciate that the hook cavity 76 as discussed above extends to the lower face 32 of the body 12 for economical manufacturing purposes. If desired, an epoxy plug or other suitable covering could be used to fill or cover the exposed lower face of the hook cavity 76.

Those skilled in the art will appreciate that various other types of mechanical locks may be used for affixing the drawer into the receiving cavity. A hook member may be affixed to either or both left-side, right-side, or top of the drawer for fitting within a suitable hook cavity in a manner apparent from the above description. Also, one or more hook members may be biased by a spring, a pliable plastic material, or other conventional biasing member for urging the hook member to fit within a suitable hook cavity when the drawer is in the fully installed position.

The transponder 16 may be of the "read only" type, so that information input into the transponder is simply read by a conventional RFID reader unit, and the information itself cannot be altered. This type of RFID transponder is well suited, for example, for quickly identifying a tagged piece of equipment based upon a 13 digit code fixed into the transponder when manufactured. The read only code may thus relate a unique identifying serial number for the tag, and that serial number will thus allow various types of information input into a system to be readily determined, i.e., equipment manufacturer, date of purchase, etc. Other transponders may be of the "read and write" type, wherein some information is fixed into the memory of the transponder, but other information can be electronically input to the transponder and subsequently read by an RFID reader unit. In this case, for example, asset identifying information may be fixed into the memory of the transponder, and relevant inspection data may be added to the available 64 digit memory of the transponder for subsequently being read by the reader unit. Accordingly, an authorized equipment safety inspector may periodically inspect the tagged equipment, and may input relevant inspection data, such as the inspector's identifying code, the inspection date, and the type of inspection, using an RFID input unit commercially available from the RFID transponder manufacturer. The information input into the transponder may then subsequently be read by a reader unit.

A method of the present invention for tagging a physical asset to assist in asset identification and safety compliance will be suggested from the foregoing description. A tag body is provided of the type disclosed herein having a receiving cavity in the tag body and extending to a front face of the tag body. An electronic transponder is positioned on a drawer, and the drawer and electronic transponder may be slid into a receiving cavity into an inserted position, with a front drawer face not extending substantially outward of the front face of the tag body, so that the electronic transponder is reliably housed within the tag body. A receptacle in the drawer may thus be sized to receive different transponders from various manufacturers. Significant advantages may be realized by selecting a suitable transponder shortly before tagging the asset, thereby enhancing tagging versatility and reducing inventory costs for the tagging system. The cost of the tagging system inventory is thus significantly advanced, and the versatility of the tagging system is increased. Moreover, the cost of manufacturing an RFID tag is reduced compared to the embedded transponder tags.

The drawer with the selected transponder may be inserted into the tagged body and automatically locked in the installed position within the receiving cavity once the drawer is fully inserted. Thereafter, an electronic reader may be used to read information stored in the transponder to identify the tagged asset. A display cavity is preferably provided within the tag body, and a visual display label may be selected and positioned within or removed from the display cavity to provide a visual warning to the operator of the equipment. Removal of the visual display label exposes warning information affixed to the tag body. First and second securing holes as discussed above may be provided in the tag body for inserting conventional screws or other securing members into respective holes, and thereby attaching the body to the physical asset. Also, first and second tie down holes may also be provided, so that one or two tie down straps may be passed over a crossbar in the tie down hole and the transponder body thus tied to the asset to be tagged. Alternatively, the lower base surface of the tag body allows the tag to be affixed to the asset by an epoxy or other suitable bonding agent.

Those skilled in the art will should now appreciate that the tag of the present invention may be used in various industries to both assist in asset identification and tracking, and to comply with safety inspection requirements, such as those required by OSHA and other company or governmental safety regulations. The petrochemical, construction, equipment rental and power generation industries are particularly well suited to use this asset tagging system. The tagging system allows for electronic identification of the tagged assets, which is extremely reliable. Moreover, asset identification and inspection status data may be obtained in a fraction of the time required when using a conventional manual tagging system with color-coded inspection tags. For regulatory compliance, the tagging system is particularly well suited for use with equipment to provide personal protective and life equipment compliance, fire protection compliance, and accident prevention compliance. For equipment identification and tracking, the system provides a permanent, durable, and cost-effective technique for identifying particular assets and tracking the location of the assets. The system thus provides safeguards against unauthorized use of equipment, reports tool and equipment operation history, and allows for tool inspection and maintenance. Equipment defects may be reliably tracked to facilitate failure analysis and warranty claims. The improved asset management and tracking system minimizes tool theft and improves tool room efficiency during check-in and check-out periods. Equipment may be easily "tagged-out" to prevent unsafe operation of the tools or equipment.

The tag of the present invention may also be used in a process safety management (PSM) system to assist in identifyng, understanding, and controlling process hazards, and to comply with environmental regulations such as 29 C.F.R. 1910 concerning "Standards for Industry." The tracking tag of this invention may thus assist with the frequent and ongoing inspection and testing involved in process safety management by (1) performing inspections and tests with regular frequency and according to equipment manufacturer recommendations, and (2) documenting each inspection and test performed on process equipment. Inspection worksheets may thus be downloaded from the computerized maintenance management system to hand held computers in order to schedule maintenance and inspections. The tag of this invention provides for inspection and testing of equipment wherein records may be easily time and date stamped, operator inspection identification may be recorded at log on, and equipment may be positively identified with a unique pin number in the RFID tag. Moreover, an inspection checklist may be prompted for each piece of equipment when the tag is scanned, and inspection results may be uploaded to the equipment history database upon completion. Accordingly, the tag of this invention may serve an important role in meeting the challenges of process safety management.

The foregoing disclosure and description of the invention is illustrative and explanatory thereof. It will be appreciated by those skilled in the art that various changes in the size, shape and materials, as well as in the details of the illustrated construction, combinations of features and the method steps discussed herein may be made without departing from the spirit of the invention.

What is claimed is:

1. An electronic tracking tag for attaching to a physical asset to assist in asset identification, the tracking tag comprising:
   a tag body having a base face, a top face opposite the base face, a front face extending between the base face and the top face, and a back face extending between the base face and the top face and opposite the front face;
   a receiving cavity within the tag body and extending to the front face;
   a drawer slidably positionable within the receiving cavity;
   an electronic transponder for positioning on the drawer, such that the drawer and electronic transponder may be slid into the receiving cavity to an inserted position with a front drawer face not extending substantially outward of the front face of the tag body and the electronic transponder housed within the tag body; and
   the tag body including a left-side face and a right-side face each extending between the base face and the top face, each of the left-side face and the right-side face having a curved configuration.

2. The electronic tracking tag as defined in claim 1, further comprising:
   a display cavity within the tag body extending to the top face of the tag body, the display cavity adapted to receive a visual display label; and
   the visual display label being selectively positionable within and removable from the display cavity within the tag body.

3. The electronic tracking tag as defined in claim 1, wherein the tag body and the drawer are each fabricated from a selected plastic material.

4. The electronic tracking tag as defined in claim 1, further comprising:
   the tag body including a hook cavity in communication with the receiving cavity; and
   a hook affixed to the drawer for hooking within the hook cavity within the tag body.

5. The electronic tracking tag as defined in claim 1, wherein the receiving cavity having a substantially rectilinear configuration extending from the front face of the tag body to a receiving cavity back surface spaced between the front face and the rear face.

6. The electronic tracking tag as defined in claim 1, wherein the top face of the tag body is curved such that a center portion of the tag body has a thickness greater than each of the left-side face and the right-side face of the tag body.

7. The electronic tracking tag as defined in claim 1, wherein the base face of the tag body lies substantially within a base plane for engagement with a flat surface on the physical asset.

8. The electronic tracking tag as defined in claim 1, further comprising:
   first and second securing holes extending through the base face, each securing hole adapted to receive a securing member for attaching the tag body to the physical asset.

9. The electronic tracking tag as defined in claim 1, further comprising:
   first and second tie down holes each extending through the base face, and a crossbar on each tie down hole for receiving a flexible strap for attaching the tag body to the physical asset.

10. An electronic tracking tag for attaching to a physical asset to assist in asset identification, the tracking tag comprising:
    a plastic material tag body having a base face, a top face opposite the base face, a front face extending between the base face and the top face, and a back face extending between the base face and the top face and opposite the front face;
    a receiving cavity within the tag body and extending to the front face;
    a hook cavity within the tag body in communication with the receiving cavity;
    a plastic material drawer slidably positionable within the receiving cavity;
    an electronic transponder for positioning on the drawer, such that the drawer and electronic transponder may be slid into the receiving cavity to an inserted position with a front drawer face not extending substantially outward of the front face of the tag body and the electronic transponder housed within the tag body; and
    a hook member affixed to the drawer for fitting within the hook cavity to secure the drawer in the inserted position within the receiving cavity.

11. The electronic tracking tag as defined in claim 10, further comprising:
    first and second securing holes extending through the base face, each securing hole adapted to receive a securing member for attaching the tag body to the physical asset.

12. The electronic tracking tag as defined in claim 10, further comprising:
    a display cavity within the tag body extending to the top face of the tag body, the display cavity adapted to receive a visual display label; and
    the visual display label being selectively positionable within and removable from the display cavity within the tag body.

13. The electronic tracking tag as defined in claim 10, wherein the base face of the tag body lies substantially within a base plane for engagement with a flat surface on the physical asset.

14. The electronic tracking tag as defined in claim 11, wherein the tag body includes a left-side face and a right-side face each extending between the base face and the top face, each of the left-side face and the right-side face having a curved configuration; and the top face of the body is curved such that a center portion of the tag body has a thickness greater than each of the left side-face and the right-side face of the tag body.

15. An electronic tagging tag as defined in claim 10, wherein the receiving cavity has a substantially rectilinear configuration extending from the front face of the tag body to a receiving cavity back surface spaced between the front face and the rear face.

16. An electronic tagging tag as defined in claim 10, further comprising:

first and second tie down holes each extending through the base face, and a crossbar on each tie down hole receiving a flexible strap for attaching the tag body to the physical asset.

17. A method of tagging a physical asset to assist in asset identification, the method comprising:

providing a tag body having a base face, a top face opposite the base face, a front face extending between the base face and the top face, a back face extending between the base face and the top face and opposite the front face, and a receiving cavity within the tag body and extending to the front face;

positioning an electronic transponder on a drawer;

sliding the drawer and the electronic transponder into the receiving cavity to an inserted position with a front drawer face not extending substantially outward of the front face of the tag body and the electronic transponder housed within the tag body;

providing a hook cavity within the tag body in communication with the receiving cavity;

inserting the drawer into the receiving cavity so that a hook affixed to the drawer fits within the hook cavity within the tag body; and subsequently using an electronic reader to read information stored in the transponder to identify the asset.

18. The method as defined in claim 17, further comprising:

providing a display cavity within the tag body extending to the top face of the tag body; and selectively positioning a visual display label within the display cavity.

19. The method as defined in claim 17, further comprising:

providing first and second securing holes in the tag body extending through the bottom face;

inserting a securing member into each respective securing hole; and attaching each securing member to the physical asset to secure the tag to the physical asset.

20. The method as defined in claim 17, further comprising:

providing first and second tie down holes each extending through the bottom face, each tie down hole including a crossbar;

passing a flexible strap through each tie down hole for attaching the tag to the physical asset.

21. An electronic tracking tag for attaching to a physical asset to assist in asset identification, the tracking tag comprising:

a tag body having a base face, a top face opposite the base face, a front face extending between the base face and the top face, and a back face extending between the base face and the top face and opposite the front face;

a receiving cavity within the tag body;

a drawer slidably positionable within the receiving cavity;

an electronic transponder for positioning on the drawer, such that the drawer and electronic transponder may be slid into the receiving cavity to an inserted position with the electronic transponder housed within the tag body; and first and second securing holes each extending through the base face, each securing hole adapted to receive a securing member for attaching the tag body to the physical asset.

22. The electronic tracking tag as defined in claim 21, further comprising:

a crossbar on each securing hole for receiving a flexible strap which serves as the securing member for attaching the tag body to the physical asset.

23. The electronic tacking tag as defined in claim 21, further comprising:

each of the first and second securing holes extending from the top face through the base face; and first and second securing screws each for positioning within a respective securing hole for serving as the securing member for attaching the tag body to the physical asset.

24. The electronic tracking tag as defined in claim 21, further comprising:

a display cavity within the tag body extending to the top face of the tag body, the display cavity adapted to receive a visual display label; and the visual display label being selectively positionable within and removable from the display cavity within the tag body.

25. The electronic tracking tag as defined in claim 21, further comprising:

a locking member for securing the drawer in the inserted position within the receiving cavity.

26. The electronic tracking tag as defined in claim 21, wherein the receiving cavity having a substantially rectilinear configuration extending from the front face of the tag body to a receiving cavity back surface spaced between the front face and the rear face.

27. The electronic tracking tag as defined in claim 21, wherein the top face of the tag body is curved such that a center portion of the tag body has a thickness greater than each of the left-side face and the right-side face of the tag body.

28. A method of tagging a physical asset to assist in asset identification, the method comprising:

providing a tag body having a base face, a top face opposite the base face, a front face extending between the base face and the top face, a back face extending between the base face and the top face and opposite the front face, and a receiving cavity within the tag body;

positioning an electronic transponder on a drawer;

sliding the drawer and the electronic transponder into the receiving cavity to an inserted position with the electronic transponder housed within the tag body;

providing first and second securing holes in the tag body each extending through the base face;

inserting a securing member into each respective securing hole;

attaching each securing member to the physical asset to secure the tag to the physical asset; and using an electronic reader to read information stored in the transponder to identify the asset.

29. The method as defined in claim 28, further comprising:

providing a crossbar in each securing hole; and passing a flexible strap through each securing hole to serve as the securing member for attaching the tag to the physical asset.

30. The method as defined in claim 28, further comprising:

providing each securing hole in the tag body extending from the top face through the base face; and positioning a screw in each securing hole to serve as a securing member for attaching the tag to the physical asset.

31. The method as defined in claim 28, further comprising:

providing a display cavity within the tag body extending to the top face of the tag body; and selectively positioning a visual display label within the display cavity.

32. The method as defined in claim 28, further comprising:

securing the drawer in the inserted position within the receiving cavity.

33. An electronic tracking tag for attaching to a physical asset to assist in asset identification, the tracking tag comprising:

a tag body having a base face, a top face opposite the base face, a front face extending between the base face and the top face, and a back face extending between the base face and the top face and opposite the front face;

a receiving cavity within the tag body;

a drawer slidably positionable within the receiving cavity;

an electronic transponder for positioning on the drawer, such that the drawer and electronic transponder may be slid into the receiving cavity to an inserted position with the electronic transponder housed within the tag body;

a display cavity within the tag body extending to the top face of the tag body, the display cavity adapted to receive a visual display label; and the visual display label being selectively positionable within and removable from the display cavity within the tag body.

34. The electronic tracking tag as defined in claim 33, wherein the top face of the tag body is curved such that a center portion of the tag body has a thickness greater than each of the left-side face and the right-side face of the tag body.

35. The electronic tracking tag as defined in claim 33, further comprising:

a locking member for securing the drawer in the inserted position within the receiving cavity.

36. The electronic tracking tag as defined in claim 33, wherein the receiving cavity having a substantially rectilinear configuration extending from the front face of the tag body to a receiving cavity back surface spaced between the front face and the rear face.

37. A method of tagging a physical asset to assist in asset identification, the method comprising:

providing a tag body having a base face, a top face opposite the base face, a front face extending between the base face and the top face, a back face extending between the base face and the top face and opposite the front face, and a receiving cavity within the tag body;

positioning an electronic transponder on a drawer;

sliding the drawer and the electronic transponder into the receiving cavity to an inserted position with the electronic transponder housed within the tag body;

providing a display cavity within the tag body extending to the top face of the tag body;

selectively positioning a visual display label within the display cavity; and using an electronic reader to read information stored in the transponder to identify the asset.

38. The method as defined in claim 37, further comprising:

forming both the tag body and the drawer from a selected plastic material.

39. The method as defined in claim 37, further comprising:

forming the receiving cavity with a substantially rectilinear configuration.

* * * * *